United States Patent
Li

(10) Patent No.: US 10,776,079 B2
(45) Date of Patent: Sep. 15, 2020

(54) TRUE RANDOM NUMBER GENERATION DEVICE AND GENERATION METHOD THEREOF

(71) Applicant: Winbond Electronics Corp., Taichung (TW)

(72) Inventor: Chia-Hsun Li, Taichung (TW)

(73) Assignee: Winbond Electronics Corp., Taichung (TW)

( * ) Notice: Subject to any disclaimer, the term of this patent is extended or adjusted under 35 U.S.C. 154(b) by 86 days.

(21) Appl. No.: 16/177,458

(22) Filed: Nov. 1, 2018

(65) Prior Publication Data

US 2019/0369964 A1 Dec. 5, 2019

(30) Foreign Application Priority Data

May 31, 2018 (TW) .............................. 107118626 A

(51) Int. Cl.
*G06F 7/58* (2006.01)
(52) U.S. Cl.
CPC .......... *G06F 7/58* (2013.01); *G06F 2207/581* (2013.01)
(58) Field of Classification Search
CPC . G06F 7/58; G06F 7/584; G06F 7/588; G06F 2207/581
USPC ................ 708/250–253, 255, 256
See application file for complete search history.

(56) References Cited

U.S. PATENT DOCUMENTS

| | | | |
|---|---|---|---|
| 8,209,367 B2 * | 6/2012 | Radja | G06F 7/588 708/251 |
| 8,321,773 B1 | 11/2012 | Pedersen | |
| 8,879,733 B2 | 11/2014 | Goettfert et al. | |
| 2002/0035586 A1 * | 3/2002 | Szajnowski | G06F 7/58 708/250 |
| 2004/0049525 A1 * | 3/2004 | Hars | G06F 7/584 708/250 |
| 2009/0262928 A1 * | 10/2009 | Busari | G06F 7/588 380/46 |
| 2017/0083289 A1 | 3/2017 | Hoeppner et al. | |
| 2018/0292857 A1 * | 10/2018 | Loubet Moundi | H03K 3/84 |

FOREIGN PATENT DOCUMENTS

| | | |
|---|---|---|
| CN | 202362767 | 8/2012 |
| CN | 103150138 | 6/2013 |
| CN | 202995706 | 6/2013 |

(Continued)

*Primary Examiner* — Andrew Caldwell
*Assistant Examiner* — Emily E Larocque
(74) *Attorney, Agent, or Firm* — JCIPRNET

(57) ABSTRACT

A true random number generation device and a true random number generation method are provided. The true random number generation device includes a selection signal providing circuit and a linear feedback shift register. The selection signal providing circuit is configured to provide a true random selection signal. The linear feedback shift register includes true random number generators of a plurality of stages. The Nth stage true random number generator is configured to receive a clock signal and a N−1th bit true random number. The Nth stage true random number generator generates a plurality of Nth stage output logic values according to the clock signal and the N−1th bit true random number, and selects one of the plurality of Nth stage output logic values to be a Nth bit true random number according to the true random selection signal.

11 Claims, 4 Drawing Sheets

(56) References Cited

FOREIGN PATENT DOCUMENTS

| | | |
|---|---|---|
| CN | 103197912 | 7/2013 |
| CN | 104636115 | 5/2015 |
| CN | 106293617 | 1/2017 |
| CN | 107017016 | 8/2017 |
| CN | 107465508 | 12/2017 |
| TW | 200504584 | 2/2005 |
| TW | 200504586 | 2/2005 |
| TW | I550406 | 9/2016 |

* cited by examiner

TRUE RANDOM NUMBER GENERATION DEVICE AND GENERATION METHOD THEREOF

CROSS-REFERENCE TO RELATED APPLICATION

This application claims the priority benefit of Taiwan application serial no. 107118626, filed on May 31, 2018. The entirety of the above-mentioned patent application is hereby incorporated by reference herein and made a part of this specification.

BACKGROUND

Technical Field

The disclosure relates to a true random number generation device and a true random number generation method that provide numbers of a plurality of bits.

Description of Related Art

Currently, common random number generation devices may be divided into pseudo random number generation devices and true random number generation devices.

The pseudo random number generation device is mainly implemented by a linear feedback shift register, and may generate evenly-distributed pseudo random numbers of a plurality of bits. However, the pseudo random numbers generated by the pseudo random number generation device are still periodic. Consequently, the generating rule of the pseudo random numbers may be solved by a logic operation. Compared to the pseudo random number generation device, the true random number generation device has no periodicity. Consequently, the true random numbers generated by the true random number generation device are unpredictable. However, since a plurality of true random number generation devices are required to generate true random numbers of a plurality of bits, the design of the true random number generation device takes up more layout space. Besides, the true random number generation device is primarily based on an analog circuit and results in more power consumption in operation. Accordingly, it is not easy for the true random number generation device to generate true random numbers with more bits.

SUMMARY

The disclosure provides a true random number generation device and a true random number generation method for generating unpredictable true random numbers of a plurality of bits.

The true random number generation device in this disclosure includes a selection signal providing circuit and a linear feedback shift register. The selection signal providing circuit is configured to provide a true random selection signal. The linear feedback shift register is coupled to the selection signal providing circuit. The linear feedback shift register is configured to generate a plurality of true random numbers. The linear feedback shift register includes true random number generators of a plurality of stages, and the true random number generators of the plurality of stages are coupled to one another in series. A Nth stage true random number generator among the true random number generators receives a clock signal, a N−1th bit true random number and the true random selection signal. The Nth stage true random number generator generates a plurality of Nth stage output logic values according to the clock signal and the N−1th bit true random number, and selects one of the plurality of Nth stage output logic values to be a Nth bit true random number according to the true random selection signal. Herein N is a natural number greater than or equal to 2.

A true random number generation method in this disclosure is adapted to generate true random numbers of a plurality of bits. The true random number generation method in one of exemplary embodiments is provided hereinafter. A true random selection signal is provided. A clock signal and a N−1th bit true random number are received, and a plurality of Nth stage output logic values are generated according to the clock signal and the N−1th bit true random number. One of the plurality of Nth stage output logic values is selected to be a Nth bit true random number according to the true random selection signal. Herein N is a natural number greater than or equal to 2.

Based on the foregoing, in this disclosure, the plurality of output logic values are generated according to the clock signal and the true random number of the previous-stage bit, and one of the plurality of output logic values is selected to be the true random number according the true random selection signal, thereby generating the unpredictable true random numbers of a plurality of bits.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
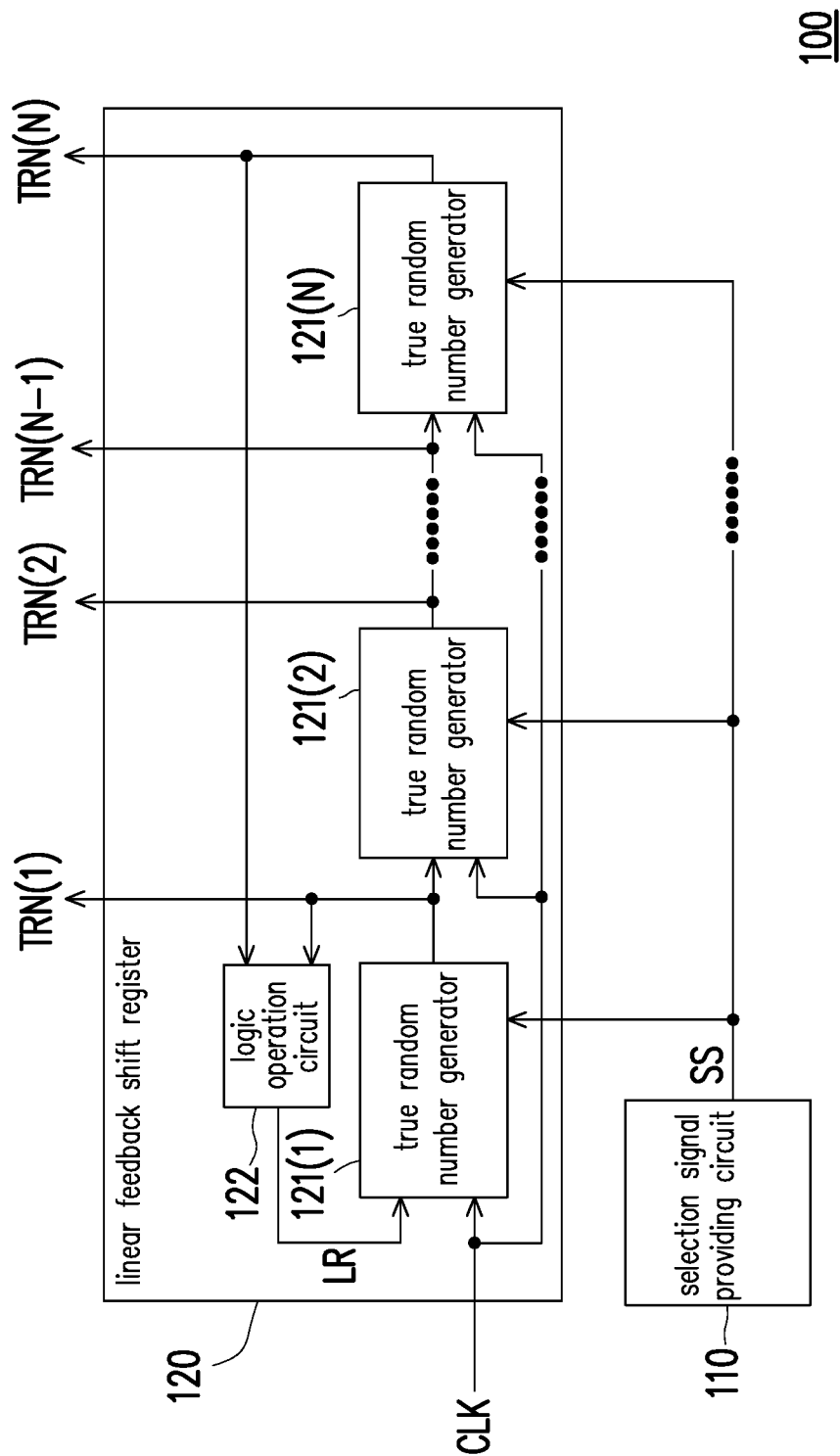
FIG. 1 is a schematic view showing a true random number generation device according to a first embodiment of the disclosure.

Please refer to FIG. 1. FIG. 1 is a schematic view showing a true random number generation device according to a first embodiment of the disclosure. In the embodiment shown in FIG. 1, a true random number generation device 100 includes a selection signal providing circuit 110 and a linear feedback shift register 120. The selection signal providing circuit 110 is configured to provide a true random selection signal SS. The linear feedback shift register 120 is coupled to the selection signal providing circuit 110. In this embodiment, the linear feedback shift register 120 is configured to generate true random numbers TRN(1) to TRN(N) of a plurality of bits. The linear feedback shift register 120 includes true random number generators 121(1) to 121(N) of a plurality of stages. The true random number generators 121(1) to 121(N) are coupled to one another in series. In this embodiment, the 2nd stage true random number generator 121(2) receives a clock signal CLK and a 1st bit true random number TRN(1). The 2nd stage true random number generator 121(2) generates a plurality of 2nd stage output logic values according to the clock signal CLK and the 1st bit true random number TRN(1), and selects one of the plurality of 2nd stage output logic values to be a 2nd bit true random number TRN(2) according to the true random selection signal SS. The 3rd stage true random number generator (not shown) receives the clock signal CLK and the 2nd bit true random number TRN(2). The 3rd stage true random number generator generates a plurality of 3rd stage output logic values according to the clock signal CLK and the 2nd bit true random number TRN(2), and selects one of the plurality of 3rd stage output logic values to be a 3rd bit true random number TRN(3) according to the true random selection signal SS, and so on and so forth.

In this embodiment, the linear feedback shift register 120 further includes a logic operation circuit 122. The logic operation circuit 122 is coupled to at least two of the true random number generators 121(1) to 121(N). The logic operation circuit 122 is configured to receive at least two of the true random numbers and to perform a logic operation to generate a logic operation result LR. For example, the logic operation circuit 122 is coupled to the true random number generators 121(1) and 121(N). The logic operation circuit 122 is configured to receive the 1st bit true random number TRN(1) provided by the true random number generator 121(1) and the Nth bit true random number TRN(N) provided by the true random number generator 121(N), and to perform a logic operation on the 1st bit true random number TRN(1) and the Nth bit true random number TRN(N) to generate the logic operation result LR. After generating the logic operation result LR, the logic operation circuit 122 provides the logic operation result LR to the 1st stage true random number generator 121(1). The 1st stage true random number generator 121(1) is configured to receive the clock signal CLK and the logic operation result LR, and to generate a plurality of 1st stage output logic values according to the clock signal CLK and the logic operation result LR. Besides, the 1st stage true random number generator 121(1) selects one of the plurality of 1st stage output logic values to be the 1st bit true random number TRN(1) according to the true random selection signal SS.

The logic operation circuit in this disclosure may be one or more in number, which is not particularly limited herein.

Next, the 1st stage true random number generator 121(1) provides the 1st bit true random number TRN(1) to the 2nd stage true random number generator 121(2), and the cycle continues accordingly. The true random number generators 121(1) to 121(N) may generate unpredictable true random numbers TRN(1) to TRN(N) respectively and continuously. The linear feedback shift register 120 organizes the true random numbers TRN(1) to TRN(N) of a plurality of bits to generate a set of true random numbers of a plurality of bits in a binary form. In this disclosure, the number of the true random number generators is greater than or equal to 2, and the number of the true random numbers as generated is also greater than or equal to 2. In the true random number generation device of this disclosure, the number of the true random number generators may be arranged according to the required bits of the true random numbers.

In this embodiment, the selection signal providing circuit 110 may be a circuit complying with the calculation principle of chaotic algorithm, and is configured to provide the true random selection signal SS in a single-bit form.

It should be noted here that the true random selection signal SS in this embodiment is an unpredictable true random number. Accordingly, in the true random number generators 121(1) to 121(N) of the plurality of stages, by means of the true random selection signal SS, one of the plurality of output logic values of the true random number generators 121(1) to 121(N) of the plurality of stages may be randomly selected to generate the true random numbers TRN(1) to TRN(N) of a plurality of bits, respectively. Besides, the true random selection signal SS may be a true random number in a single-bit form. Consequently, the selection signal providing circuit 110 may occupy less layout space. Compared to the selection signal providing circuit that provides true random numbers of a plurality of bits, the selection signal providing circuit 110 configured to provide single-bit true random numbers may have lower power consumption.

Figure 2:
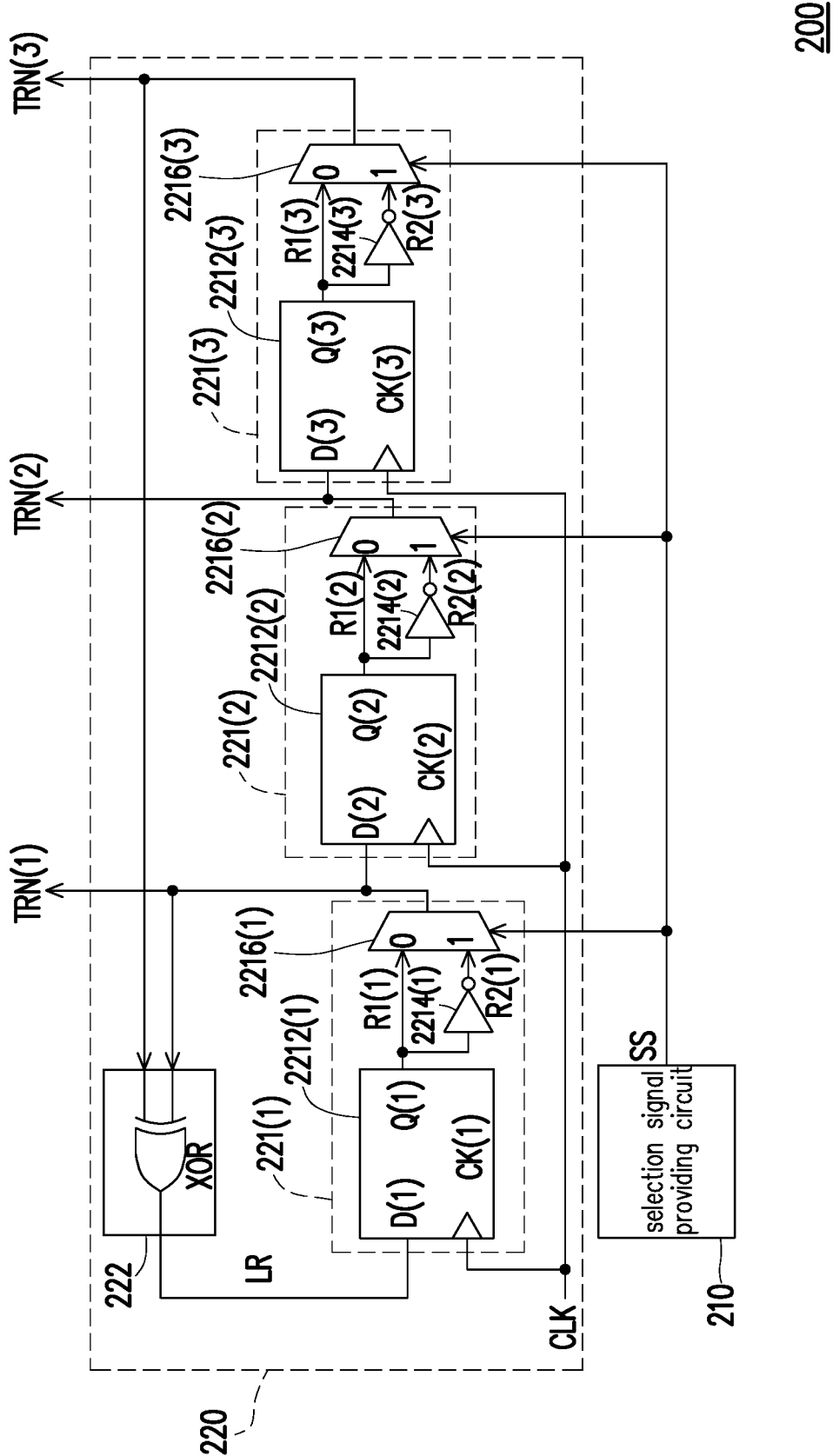
FIG. 2 is a circuit diagram schematically showing a true random number generation device according to a second embodiment of the disclosure.

Furthermore, please refer to FIG. 2. FIG. 2 is a circuit diagram schematically showing a true random number generation device according to a second embodiment of the disclosure. In the embodiment shown in FIG. 2, for the purpose of convenient illustration, a linear feedback shift register 220 includes three true random number generators 221(1) to 221(3). The true random number generator 221(1) includes a flip-flop 2212(1), an inverter 2214(1) and a selection circuit 2216(1). The true random number generator 221(2) includes a flip-flop 2212(2), an inverter 2214(2) and a selection circuit 2216(2). The true random number generator 221(3) includes a flip-flop 2212(3), an inverter 2214(3) and a selection circuit 2216(3).

In this embodiment, the flip-flop 2212(1) has a data input terminal D(1), a clock input terminal CK(1) and a data output terminal Q(1). The data input terminal D(1) is configured to receive a logic operation result LR, and the clock input terminal CK(1) is configured to receive a clock signal CLK. The flip-flop 2212(1) generates a first logic value R1(1) according to the logic operation result LR and the clock signal CLK, and outputs the first logic value R1(1) via the data output terminal Q(1). An input terminal of the inverter 2214(1) is coupled to the data output terminal Q(1) of the flip-flop 2212(1). The inverter 2214(1) is configured to receive the first logic value R1(1) and to generate a second logic value R2(1) after an inverse calculation is performed. In other words, in this embodiment, a plurality of 1st stage output logic values include the first logic value R1(1) and the second logic value R2(1). The selection circuit 2216(1) is coupled to the data output terminal Q(1) of the flip-flop 2212(1), an output terminal of the inverter 2214(1) and a selection signal providing circuit 210. The selection circuit 2216(1) is controlled by a true random selection signal SS in a single-bit form, and selects one of the first logic value R1(1) and the second logic value R2(1) to be a 1st bit true random number TRN(1) according to the true random selection signal SS.

For example, when the logic value of the true random selection signal SS is "0", the selection circuit 2216(1) then selects the first logic value R(1) to be the 1st bit true random number TRN(1). On the contrary, when the logic value of the true random selection signal SS is "1", the selection circuit 2216(1) then selects the second logic value R2(1) to be the 1st bit true random number TRN(1).

In this embodiment, the selection circuit 2216(1) may be implemented by a 2-to-1 multiplexer. The selection circuit 2216(1) has a first input terminal, a second input terminal, a control terminal and an output terminal. The first input terminal of the selection circuit 2216(1) is coupled to the data output terminal Q(1) for receiving the first logic value R1(1). The second input terminal of the selection circuit 2216(1) is coupled to the output terminal of the inverter 2214(1) for receiving the second logic value R2(1). The control terminal of the selection circuit 2216(1) is coupled to the selection signal providing circuit 210 for receiving the true random selection signal SS. The output terminal of the selection circuit 2216(1) is configured to provide the 1st bit true random number TRN(1). In other embodiments, the selection circuit 2216(1) may be implemented by a transmission gate.

The flip-flop 2212(2) has a data input terminal D(2), a clock input terminal CK(2) and a data output terminal Q(2). The data input terminal D(2) is configured to receive the 1st bit true random number TRN(1), and the clock input terminal CK(2) is configured to receive the clock signal CLK. The flip-flop 2212(2) generates a first logic value R1(2) according to the 1st bit true random number TRN(1) and the clock signal CLK, and outputs the first logic value R1(2) via the data output terminal Q(2). In other words, in this embodiment, a plurality of 2nd stage output logic values include the first logic value R1(2) and a second logic value R2(2). An input terminal of the inverter 2214(2) is coupled to the data output terminal Q(2) of the flip-flop 2212(2). The inverter 2214(2) is configured to receive the first logic value R1(2) and to perform an inverse calculation on the first logic value R1(2) to generate the second logic value R2(2). The selection circuit 2216(2) is coupled to the data output terminal Q(2) of the flip-flop 2212(2), an output terminal of the inverter 2214(2) and the selection signal providing circuit 210. The selection circuit 2216(2) is controlled by the true random selection signal SS to receive the first logic value R1(2) and the second logic value R2(2). The selection circuit 2216(2) selects one of the first logic value R1(2) and the second logic value R2(2) to be a 2nd bit true random number TRN(2) according to the true random selection signal SS.

The flip-flop 2212(3) has a data input terminal D(3), a clock input terminal CK(3) and a data output terminal Q(3). The data input terminal D(3) is configured to receive the 2nd bit true random number TRN(2), and the clock input terminal CK(3) is configured to receive the clock signal CLK. The flip-flop 2212(3) generates a first logic value R1(3) according to the 2nd bit true random number TRN(2) and the clock signal CLK, and outputs the first logic value R1(3) via the data output terminal Q(3). An input terminal of the inverter 2214(3) is coupled to the data output terminal Q(3) of the flip-flop 2212(3). The inverter 2214(3) is configured to receive the first logic value R1(3) and to perform an inverse calculation on the first logic value R1(3) to generate a second logic value R2(3). In other words, in this embodiment, a plurality of 3rd stage output logic values include the first logic value R1(3) and the second logic value R2(3). The selection circuit 2216(3) is coupled to the data output terminal Q(3) of the flip-flop 2212(3), an output terminal of the inverter 2214(3) and the selection signal providing circuit 210. The selection circuit 2216(3) is controlled by the true random selection signal SS to receive the first logic value R1(3) and the second logic value R2(3). The selection circuit 2216(3) selects one of the first logic value R1(3) and the second logic value R2(3) to be a 3rd bit true random number TRN(3) according to the true random selection signal SS.

In this embodiment, a logic operation circuit 222 includes an XOR gate XOR. The XOR gate XOR has two input terminals. The two input terminals of the XOR gate XOR are respectively coupled to the true random number generators 221(1) and 221(3) to receive the 1st bit true random number TRN(1) and the 3rd bit true random number TRN(3). The XOR gate XOR performs a logic operation on the 1st bit true random number TRN(1) and the 3rd bit true random number TRN(3) to generate the logic operation result LR. In this embodiment, if a logic calculation based on the XOR gate XOR is performed with the 1st bit true random number TRN(1) and the 3rd bit true random number TRN(3) being the same, a logic operation circuit 322 then provides a logic value of "0" as the logic operation result LR. Otherwise, the logic operation circuit 322 provides a logic value of "1" as the logic operation result LR.

Figure 3:
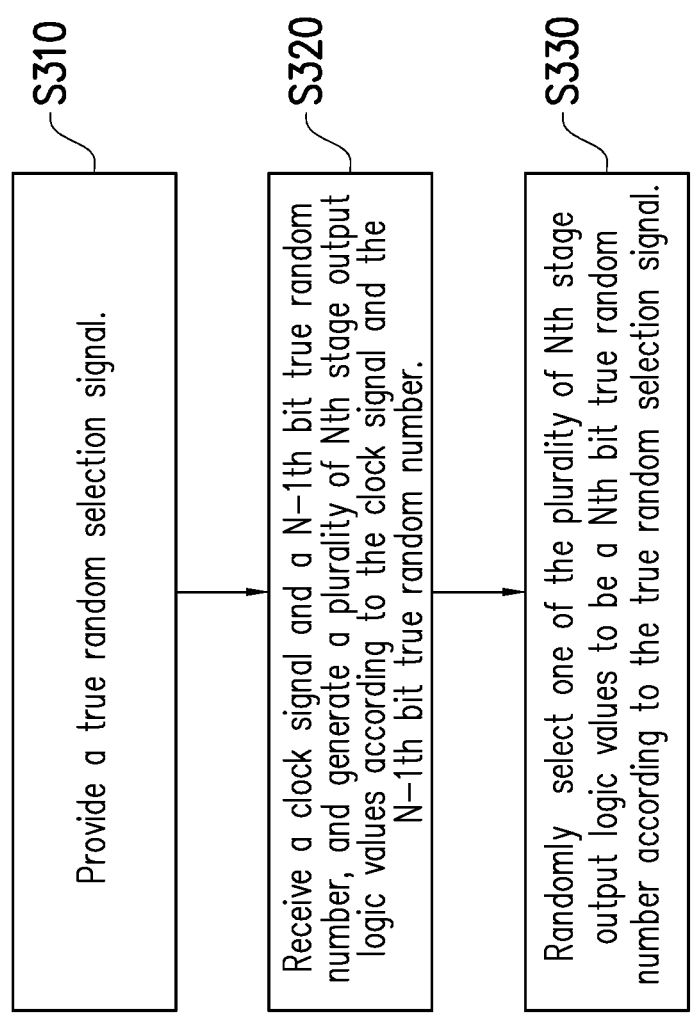
FIG. 3 is a flowchart showing a true random number generation method according to an embodiment of the disclosure.

Please refer to FIG. 2 and FIG. 3 simultaneously. FIG. 3 is a flowchart showing a true random number generation method according to an embodiment of the disclosure. In step S310, a true random selection signal SS is provided. In step S320, a clock signal and a N−1th bit true random number are received, and a plurality of Nth stage output logic values are generated according to the clock signal and the N−1th bit true random number. Taking the true random number generator 221(2) as an example, the true random number generator 221(2) receives the clock signal CLK and the 1st bit true random number TRN(1), and generates the first logic value R1(2) and the second logic value R2(2) of the 2nd stage output logic values according to the 1st bit true random number TRN(1). Next, in step S330, one of the plurality of Nth stage output logic values is selected to be a Nth bit true random number according to the true random selection signal SS. Similar to the foregoing example, the true random number generator 221(2) selects one of the first logic value R1(2) and the second logic value R2(2) to be the 2nd bit true random number TRN(2) according to the true random selection signal SS.

Figure 4:
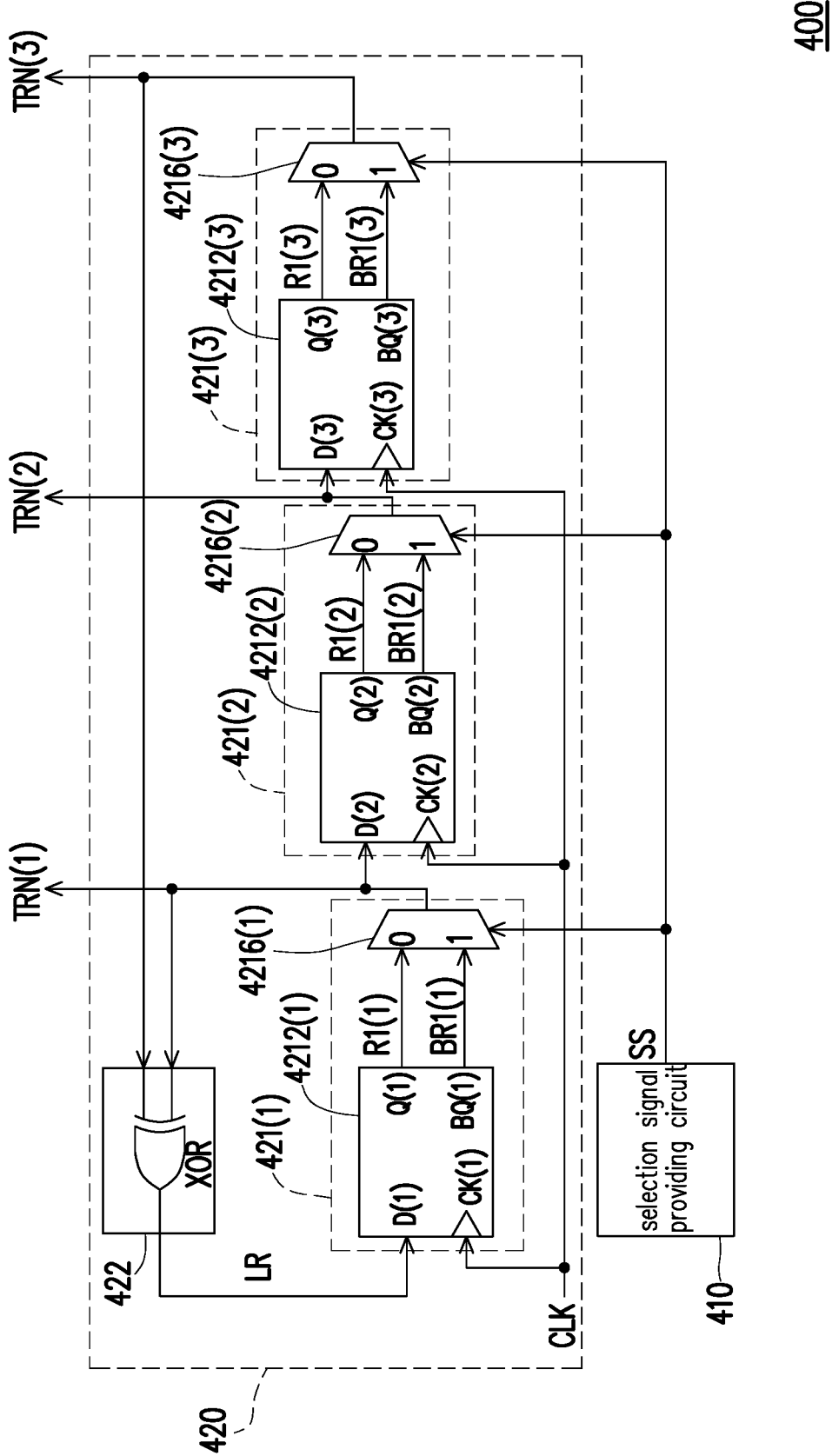
FIG. 4 is a circuit diagram schematically showing a true random number generation device according to a third embodiment of the disclosure.

Please refer to FIG. 4. FIG. 4 is a circuit diagram schematically showing a true random number generation device according to a third embodiment of the disclosure. Different from FIG. 2, in a 1st stage true random number generator 421(1) of this embodiment, a flip-flop 4212(1) may provide a first logic value R1(1) via a data output terminal Q(1), and provide a second logic value BR1(/) via an inverted data output terminal BQ(1). A first input terminal of a selection circuit 4216(1) is coupled to the data output terminal Q(1) and is configured to receive the first logic value R1(1), and a second input terminal of the selection circuit 4216(1) is coupled to the inverted data output terminal BQ(1) and is configured to receive the second logic value BR1(1). Accordingly, the selection circuit 4216(1) selects one of the first logic value R1(1) and the second logic value BR1(1) to be a 1st bit true random number TRN(1) according to a true random selection signal SS.

In a 2nd stage true random number generator 421(2), a flip-flop 4212(2) may provide a first logic value R1(2) via a data output terminal Q(2), and provide a second logic value BR1(2) via an inverted data output terminal BQ(2). A first input terminal of a selection circuit 4216(2) is configured to receive the first logic value R1(2), and a second input terminal of the selection circuit 4216(2) is configured to receive the second logic value BR1(2). Accordingly, the selection circuit 4216(2) selects one of the first logic value R1(2) and the second logic value BR1(2) to be a 2nd bit true random number TRN(2) according to the true random selection signal SS. The configuration of a 3rd stage true random number generator 421(3) is also similar to that of the 2nd stage true random number generator 421(2), so details thereof are not repeated hereinafter.

To summarize, in this disclosure, the plurality of output logic values are generated according to the clock signal and the true random number of the previous-stage bit. The true random selection signal is an unpredictable true random number. Accordingly, by means of the true random selection signal, one of the plurality of output logic values is randomly selected to be the true random number, thereby making the true random number unpredictable. Besides, even the true random selection signal in a single-bit form may achieve the foregoing effect. Consequently, the selection signal providing circuit may occupy less layout space and have lower power consumption.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A true random number generation device, comprising:
    a selection signal providing circuit configured to provide a true random selection signal;
    a linear feedback shift register coupled to the selection signal providing circuit and configured to generate a plurality of true random numbers, the linear feedback shift register comprising:
    true random number generators of a plurality of stages, wherein the true random number generators are coupled to one another in series, wherein a Nth stage true random number generator among the true random number generators receives a clock signal, a N−1 th bit true random number and the true random selection signal, generates a plurality of Nth stage output logic values according to the clock signal and the N−1 th bit true random number, and selects one of the plurality of Nth stage output logic values to be a Nth bit true random number according to the true random selection signal, wherein N is a natural number greater than or equal to 2; and
    a logic operation circuit coupled to at least two of the true random number generators to receive at least two of the plurality of true random numbers, and performing a logic operation on the at least two of the plurality of true random numbers to generate a logic operation result.

2. The true random number generation device as recited in claim 1, wherein a 1st stage true random number generator among the true random number generators receives the clock signal and the logic operation result, generates a plurality of 1st stage output logic values according to the clock signal and the logic operation result, and selects one of the plurality of 1st stage output logic values to be a 1st bit true random number according to the true random selection signal.

3. The true random number generation device as recited in claim 1, wherein the Nth stage true random number generator comprises:
    a flip-flop having a data input terminal, a clock input terminal and a data output terminal, wherein the data input terminal is configured to receive the N−1th bit true random number, the clock input terminal is configured to receive the clock signal, and the data output terminal is configured to output a first logic value of the plurality of Nth stage output logic values.

4. The true random number generation device as recited in claim 3, wherein the Nth stage true random number generator comprises:
    an inverter, wherein an input terminal of the inverter is coupled to the data output terminal, and the inverter is configured to receive the first logic value and to perform an inverse calculation on the first logic value to generate a second logic value of the plurality of Nth stage output logic values; and
    a selection circuit coupled between the data output terminal of the flip-flop, an output terminal of the inverter and the selection signal providing circuit for receiving the first logic value and the second logic value, and selecting one of the first logic value and the second logic value to be the Nth bit true random number according to the true random selection signal.

5. The true random number generation device as recited in claim 4, wherein the selection circuit is a 2-to-1 multiplexer.

6. The true random number generation device as recited in claim 4, wherein the selection circuit has a first input terminal, a second input terminal, a control terminal and an output terminal, wherein the first input terminal is coupled to the data output terminal for receiving the first logic value, the second input terminal is coupled to the output terminal of the inverter for receiving the second logic value, the control terminal is coupled to the selection signal providing circuit for receiving the true random selection signal, and the output terminal is configured to provide the Nth bit true random number.

7. The true random number generation device as recited in claim 1, wherein:
    the selection signal providing circuit is a circuit complying with a calculation principle of a chaotic algorithm, and is configured to provide the true random selection signal in a single-bit form.

8. The true random number generation device as recited in claim 1, wherein the Nth stage true random number generator comprises:
    a flip-flop having a data input terminal, a clock input terminal, a data output terminal and an inverted data output terminal, wherein the data input terminal is configured to receive the N−1th bit true random number, the clock input terminal is configured to receive the clock signal, the data output terminal is configured to provide a first logic value of the plurality of Nth stage output logic values, and the inverted data output terminal is configured to provide a second logic value of the plurality of Nth stage output logic values; and
    a selection circuit coupled to the data output terminal of the flip-flop and the selection signal providing circuit and having a first input terminal, a second input terminal, a control terminal and an output terminal, wherein the first input terminal is configured to receive the first logic value, the second input terminal is configured to receive the second logic value, the control terminal is configured to receive the true random selection signal, and the output terminal is configured to provide the Nth bit true random number, thereby selecting one of the first logic value and the second logic value to be the Nth bit true random number according to the true random selection signal.

9. A true random number generation method adapted to generate true random numbers of a plurality of bits, the true random number generation method comprising:
    providing a true random selection signal;
    receiving a clock signal and a N−1 th bit true random number, and generating a plurality of Nth stage output logic values according to the clock signal and the N−1th bit true random number;

selecting one of the plurality of Nth stage output logic values to be a Nth bit true random number according to the true random selection signal, wherein N is a natural number greater than or equal to 2;

performing a logic operation on at least two of the true random numbers to generate a logic operation result; and receiving the clock signal and the logic operation result, generating a plurality of 1st stage output logic values according to the clock signal and the logic operation result, and selecting one of the plurality of 1st stage output logic values to be a 1st bit true random number according to the true random selection signal.

10. The true random number generation method as recited in claim 9, wherein selecting one of the plurality of Nth stage output logic values to be the Nth bit true random number according to the true random selection signal comprises:

generating a first logic value and a second logic value of the plurality of Nth stage output logic values; and selecting one of the first logic value and the second logic value to be the Nth bit true random number according to the true random selection signal.

11. The true random number generation method as recited in claim 9, wherein the true random selection signal is a selection signal in a single-bit form provided based on a calculation principle of a chaotic algorithm.

* * * * *